H. Cowing,
Agricultural Machine,
No. 80,795. Patented Aug. 4, 1868.

H. Cowing,
Agricultural Machine
Nº 80,795.  Patented Aug. 4. 1868.

H. Cowing,
Agricultural Machine,
N⁰ 80,795. Patented Aug. 4, 1868.

Witnesses:
C. A. Pettit.
S. C. Kenon

Inventor.
Henry Cowing
by Munn & Co
Attorneys.

UNITED STATES PATENT OFFICE.

HENRY COWING, OF NEW ORLEANS, LOUISIANA.

IMPROVEMENT IN AGRICULTURAL MACHINES.

Specification forming part of Letters Patent No. 80,795, dated August 4, 1868.

*To all whom it may concern:*

Be it known that I, HENRY COWING, of New Orleans, in the parish of Orleans and State of Louisiana, have invented a new and Improved Agricultural Machine; and I do hereby declare that the following is a full, clear, and exact description of the construction and operation of the same, reference being had to the accompanying drawings, making a part of this specification, in which—

Fig. 17 is a cross-section of the cylinder for sowing, &c., showing the arrangement of the different-sized cups. Fig. 18 is a top view of the same.

This invention consists in a novel arrangement and combination of plows, harrows, seeders, and markers with steering apparatus, elevating and depressing devices, draft attachment, and adjusting apparatus, by which the plows, &c., can be used in different combinations for different purposes, such as breaking up new soil and planting and cultivating corn, wheat, cotton, cane, and other vegetables and cereals, cutting and lowering cane-stubble, ditching, under-draining, &c. The machine can be operated either by steam, or by horse-power, or oxen.

Figures 1, 5:
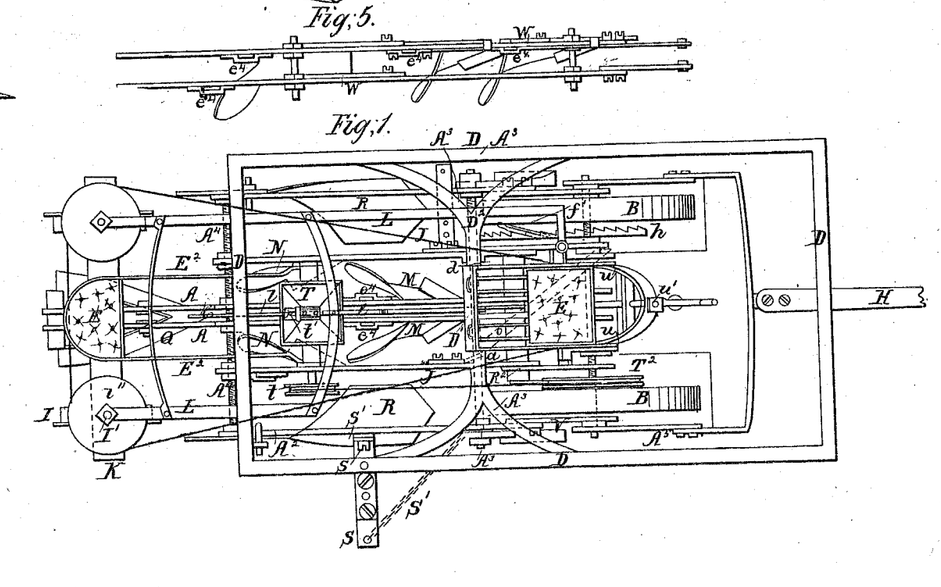
Figure 1 is a top view.
Fig. 5, a top view of the same.
Figures 2, 3, 7:
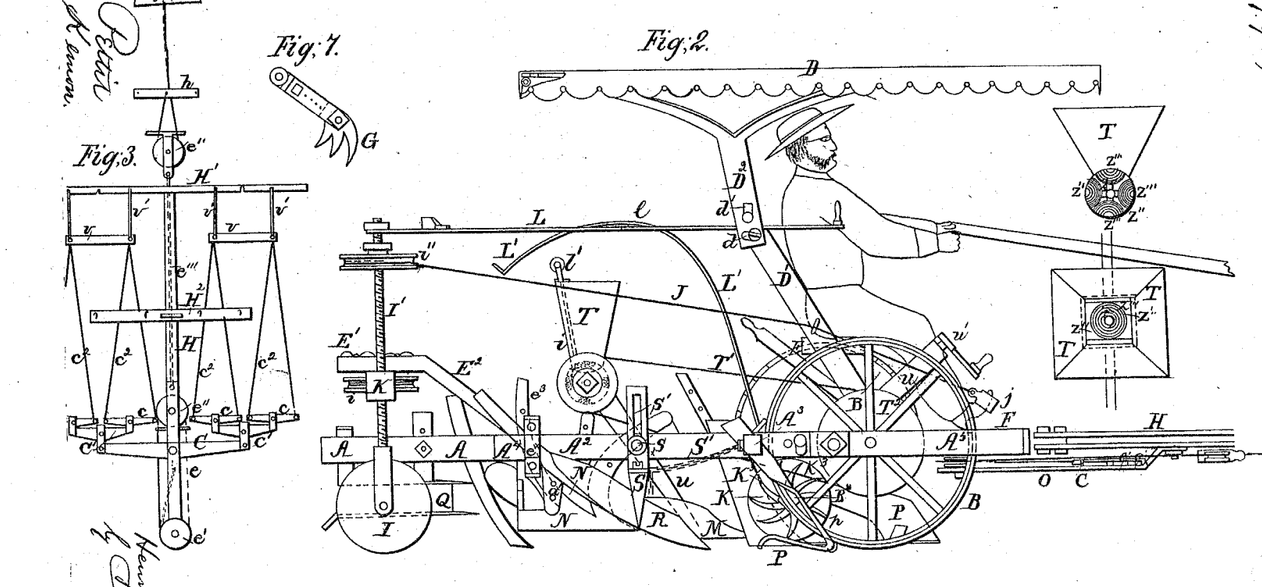
Fig. 2 is a side elevation.
Fig. 3, a detached top view of the whiffletrees and their combination with the traces and elastics.
Fig. 7, a detached view of the harrow.

In the drawings, B B are the draft-wheels; $B^1$, the axle; E, the front driver's seat; $E'$, the rear driver's seat; D, the canopy over the front seat, supported by standards $D^1 D^1$ and an adjustable frame, $D^2$; F, a platform on the front part of the frame, for the driver to stand upon; H, the draft-pole, to which are attached cross-trees $H^1 H^2$; I I, the steering-wheels, operated by ropes or chains J J, or by levers L $L^1$; K, the digging-wheels, for tearing and pulverizing the soil in front of the plows; G, the harrow; O, a scraper, for cutting off cane-stubble in front of the plows; P P, the forward plows, connected by the scraper O; M M, the opening-plows; N N, the covering-plows; Q, the leveling-scraper, which follows the covering-plows and levels off the earth upon the seed, equalizing its depth, and removing clods, sticks, stones, &c., therefrom; R R, large outside scoops, for ditching, covering cane, &c.; S, the adjustable marker; and T, the seed-box, from which a conductor, U, descends to a point immediately behind and between the mold-boards of the opening-plows. All these parts may be combined and arranged together as shown in Figs. 1 and 2, or their position and combination may be modified, as exhibited in the other drawings, and as will be hereinafter described.

The frame of the instrument, when the plows are elevated, is supported by the draft-wheels, steering-wheels, and draft-pole. When the plows are depressed, it rests in part upon them, but still, in the main, upon the wheels. It consists of two parts—one, $A^5$, in front of the draft-wheels, having its forward edge supported by the rear end of the draft-pole, and its rear edge supported by the axle-tree, to which it is hinged or otherwise attached; the other in the rear of the draft-wheels, and supporting the plows, harrow, marker, scrapers, steering apparatus, seeding apparatus, &c. This part of the frame is hinged to the rear end of the fixed forward part, and to the axle-tree, by means of adjustable arms or link-connections V V, which enable it to be raised so as to lift the plows, &c., away from the ground.

As shown by the top views, the frame consists of four longitudinal bars, A A A¹ A¹, arranged parallel to each other inside of the draft-wheels, and two, A² A², outside of said wheels, the six bars being united by two or more cross-bars, A³ A⁴, and being hinged at their forward ends to the arms V V. The axle-tree is cut with screw-threads, or otherwise constructed to adapt it to set the arms V V at any relative distances apart; and the cross-bars A³ A⁴ are similarly constructed, to enable them to hold the frame-pieces A A¹ A² at such distances apart as to accommodate them to the arms V V, to which they are severally jointed.

My favorite plan of constructing the whole frame device is to screw the cross-bars and axle directly through the frame-pieces and arms, fastening a nut, screw-plate, washer, or collar, $a\ a$, on either side of the longitudinal beams or arms, to strengthen and steady the connection, and prevent the parts from warping and twisting.

In addition to this, another cross-bar, N¹, screws through lugs or standards, $a^1\ a^1$, depending from or projecting upward from the beams A A, opposite to or a little behind the seeding apparatus, the object of this additional screw-rod and its supporting-lugs being to further strengthen the standards of the plows, and prevent the latter from being pressed against the land, they having no landsides, the pressure upon one mold-board being equalized by that on the opposite side. Having no soles, the weight of the plows and soil is thrown upon the wheels, whereby at least one-half of the power that would otherwise be necessary to run the machine is saved, and the subsoil or bottom of the furrow is not rendered a hard-pan. A similar rod is used to each two plows, except the double mold-board. The rods further strengthen and support the frame of the machine.

Having thus given a general description of the apparatus, I will now proceed to describe more specifically the construction and operation of the several parts thereof; and First, the traces and whiffletrees. These are constructed to equalize the draft of the several teams, being adapted to any number of horses or oxen that may be required, according to the size of the instrument employed in any particular case, and the nature of the ground. In the drawings, $c\ c$ are single-trees, affixed to a double-tree, $c^1$, on each side of the draft-pole, the two double-trees being connected to the quadruple-tree or main whiffletree C. Each horse is connected to the single-trees by means of traces or other harness, $c^2\ c^2$, and tied to the cross-bar H', in front of the horses, by an elastic rope, strap, or spring, $v'\ v'$, which is fastened to his under jaw, or bit of the horse, or nose of the oxen. The whiffletree C slides longitudinally with the draft-pole, a pin or bolt from it projecting through a slot in the draft-pole. A cord or chain, $e$, passes from the whiffletree back over a fixed pulley, $e'$, and then forward over a movable pulley, $e''$, from whence it is carried back and fastened to the frame of the machine in rear of the pulley $e'$. From the movable pulley a cord or chain, $e'''$, runs forward beyond the cross-tree H', where it is connected with the forward team, and receives their draft. The object of this arrangement is to equalize the power exerted by eight horses in front of the cross-bar H' by that of four horses behind it, as by its use the force exerted by the latter is doubled. A tongue and slide-bar, similar to the one used, may be jointed to its forward end for each additional team, to hold up the whiffletrees from the horses' heels. With the apparatus thus constructed, if the two forward teams move faster or draw more vigorously than the rear horses, they do not relieve the latter of their share of the work, but cause the elastic cords to pull with great power upon their bits or under jaws, placing them in a very uncomfortable position, and rendering it necessary for them to spring to their work with alacrity, in order to relieve themselves. So, too, if the rear horses, on either side of the pole, spring forward or lag behind, so as to render the draft unequal, the sliding whiffletree will distribute such inequality to all the other teams, so as not to bring an overwhelming pressure upon the horses nearest to those which are in fault. The whole arrangement is such as admirably to take up and distribute among all the horses every inequality in the draft, thereby saving the team from much fatigue, and enabling it to work longer and better than if working in any other harness yet devised for a similar purpose, the tongue being removable by taking out the bolts $i\ i$ for the attachment of steam-power, or, by taking out one of the bolts, it causes a joint, so that the machine may be steered to the greatest nicety independent of the horses.

Secondly, the seeding apparatus. This consists of the box T and conductor U, hereinbefore described, with an agitator and distributer, and adjusting and operating devices. The agitator and distributer consist of a double-grooved cylinder, rotating under the lower end of the seed-box, by means of a belt, T¹, and pulley $t$, the belt being actuated by pulley T² on the axle B'; inside of the draft-wheel, or on the rotary cutter digger-shaft. The latter may be deemed most desirable, as the digging-wheel can be raised from the ground, and the dropping of grain stopped, while the machine is being turned, or transported from place to place. A revolving cylinder, $z''$, is placed under a hopper or seed-box, T, and is provided with four or more cylindrical cavities, for the purpose of receiving and conveying seed to the conductor. These cavities are provided with nests of cups $z'''$, fitting inside of each other like apothecaries' weights, whereby they can be added or removed, and the cavities entirely closed, or sufficient space left for the accommodation of the smallest grain, or potatoes, or other vegetables mixed with fertilizers. The cups are held in place by a screw passing through their bottoms into the cylinder. When all of the cups are in place the cylinder presents a smooth surface, and a slide-valve, $i'$, is employed inside of the seed-box, the arm or handle of which is seen projecting above the box in Fig. 2, for the purpose of regulating the feed of the grain from the seed-box to the cylinder, and thence to the conductor U. For wheat or other cereals the cylinder $z''$ is grooved. $z''''$, the back part of the hopper, is fitted into the grooves, while in front openings are made corresponding to the grooves, which are opened or closed by a slide, $i$, which has an arm extending above the hopper, as shown in Fig. 2, which is adjusted by a thumb-screw for the purpose of regulating the quantity of grain sown. The grooves may be omitted and only openings made in the hopper for the passage of the grain, if desired. The grain falls into separate tubes from each groove or opening, which lead behind each plow, where it strikes a convex plate, $y$, scattering it to the full width of the furrow, which is covered by the following plow. If desired, the mold-boards may be taken off and the seed dropped behind the share, to which the conductor may be bolted; or a double-shovel plow may be substituted, raising the soil from three to four inches without turning it, the construction of the shovel allowing the soil to fall back and cover the grain. The plows may be set in one frame, so as to be opposite each other. The digging-wheel thoroughly pulverizes the soil in front, and the harrow may be applied to the shaft $A^4$ behind the plows, by which arrangement the seed is scattered the full width of the furrow, as it were, broadcast, covered equally to any depth desired, and harrowed, all at one operation. By pulverizing the land, and sowing and harrowing at one operation, the soil does not become dry between plowing and sowing, but the seed derives the full benefit of the moisture it contains, and comes up without suffering from drought in its infancy, as is often the case.

Third, the steering apparatus. This apparatus consists of the flanged steering-wheels I I, and the connected attachment for regulating and operating them. $I' I'$ are vertical screw standards or stems, which support the steering-wheels, and screw through trucks or sheaves $i i$, and are fixed to other sheaves above, $i' i'$. By turning the sheaves $i i$ the standards may be adjusted up or down. When cotton-seed, corn, or potatoes are planted, the converse plate is taken off, and the seed conducted under the point of the plow, the point of which going deeper makes a furrow for the seed, so that it is in a straight line, and, by turning the sheaves $i' i'$, the steering-wheels may be directed as described. A rope or chain, J, and stirrups $j j$ may be employed to turn the sheaves $i' i'$, or levers L L, either compound or single, may be attached to the upper end of the standards $I' I'$, and extend forward to the side of the front seat. When made compound they may be united by a cross-bar, $l$, and, for the convenience of the driver when sitting on the rear seat, a second lever, $L'$, pivoted at its forward and lower end, may cross the bar $l$, being connected to it by a pin or bolt, $l'$, and extend to a point within easy reach of the rear seat. The rear seat is supported upon standards $E^2$ attached to the side pieces of the frame, and extending upward and backward. The under side of the seat rests upon a cross-beam, $k$, which connects the two vertical standards $I' I'$. Said cross-beam is made adjustable in length, so that the two standards can be moved toward or from each other. The sheaves $i i$ operate in slots in the cross-beam, or, if the cross-beam is made in two pieces, an upper and a lower piece, connected together at their ends, with a space between them, the sheaves may be situated in such space. In such case, the two ends of the cross-beam may be separate pieces, the inner end of one overlapping that of the other, and the parts being united and rendered adjustable by set-screws or bolts, operating in slots, in a manner well understood by every practical mechanic.

Figure 10:
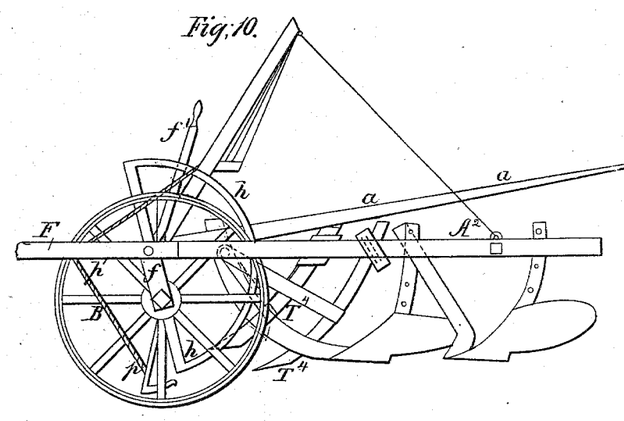
Fig. 10 is a side elevation, showing a different arrangement for elevating the plows, and a different combination for breaking up the land.
Figure 11:
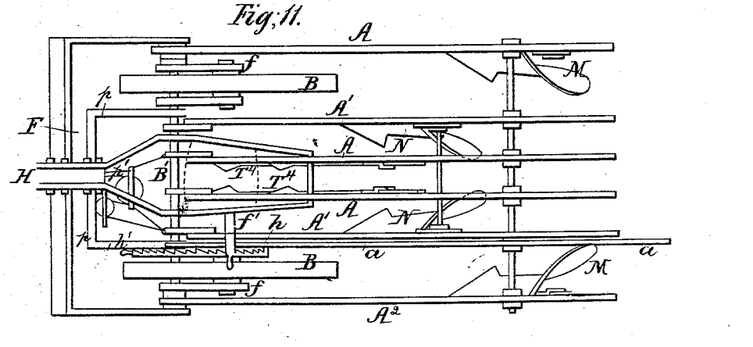
Fig. 11, a top view of the same.

Fourth, the apparatus for adjusting the height of the hinged or rear portion of the frame. This consists of an arched piece, $u$, affixed to the standards $D' D'$, and projecting upward and forward, as a base from which to operate, and a screw-rod, $u'$, extending downward through it, and serving to raise or lower a short cross-bar. The cross-bar has a lug at each end, to which an arm, $v^2$, is hinged, that extends down to the arms V V, and is hinged at its lower end, either to them or to a cross-piece that extends across them, all being so connected with them that when it is elevated or depressed by the screw $u'$, it raises or lowers all the arms V V, and thereby raises or lowers the forward end of the pivoted main-frame of the machine. It is evident, therefore, that by screwing up or unscrewing the rod $u'$ and standards $I' I'$, all that part of the frame which supports the working apparatus can be elevated or depressed at pleasure, raising the plows, harrow, marker, digging-wheels, cutters, &c., from the ground to any extent required, or bringing them into contact with the ground, as may be necessary. Another means of adjusting the height of the frame, plows, &c., and of elevating or depressing them suddenly, is shown in Figs. 10 and 11, in which the axle is provided at each end to contain beams outside of the wheels, and with a crank or double crank, $f$, and the wheel is supported upon the crank-pin, the frame being supported upon the axle. A semicircular rack-lever, $h$, is firmly attached to the axle, and is provided with projecting pins or handles $h'$, for the driver to take hold of. A stop-lever, $f^1$, springs into the teeth of the rack or ratchet $h$, and holds the latter in position. When the driver wants to raise the plows from the ground he seizes the pin of the rack, and, by means of it, turns the axle so as to throw the crank down. To raise the plows again, it is only necessary to reverse the position of the crank. If desired, a tripping-pole or frame, $p$, can be hinged to the axle, and swung under the forward part of the frame, its front end being held up by a cord or chain, $p'$, which passes up through the platform, and is held within easy reach of the driver. The cord can be attached to a spindle, spool, roller, or lever, so as to be controlled more easily, if thought necessary. By dropping the forward end of the tripping-pole upon the ground, it throws up the axle and frame, the team itself raising the whole apparatus from the ground quickly and easily, without the necessity of the driver's exerting any power whatever, save to disengage the cord. Through this means the heaviest machine can be perfectly controlled by a mere boy. A long compound lever, $f^2$, could be used instead of the handle $h'$, if required, or if the driver wishes to operate the apparatus from the rear seat, one end of this compound lever is attached to the axle-tree. On the side of the lever is a plate projecting, and works into the ratchet of the semicircular lever $h$, which forms a powerful compound lever; by which a great weight may be raised.

Fifth, the adjustment of the plows. Their adjustment in height is effected by the several plow-curved standards, which either pass through slots, clamps, or box-straps, and are confined by wedges, pins, or otherwise to the beams A A¹ A², or are provided with a series of holes, through which they may be pinned or bolted to the frame-pieces, so as to bring the plows at the proper height from the ground. The opening and covering plows and the leveling-scraper are provided with two standards each, one answering the purpose of a support to the heel of the instrument, and the other answering the purpose of a support to its toe, and at the same time operating as a colter. Each of these standards is vertically adjustable upon the beam above. By this means the height or the pitch of the plows and scraper may be adjusted at pleasure. The plows may also be adjusted to and from each other by the nuts on the screws 1 2 3. The screw No. 1 forms the axle-tree. No. 2, behind the wheels, is for strengthening and holding firmly together and raising the outside beams, as seen in Figs. 1 and 2, by the means hereinbefore described for regulating the position of the beams A A¹ A², to which they are all attached, and with which they can be moved from side to side, or up and down. The marker can be adjusted in or out from the frame by attaching its marking-point to a projecting arm, composed of two plates, one overlapping the other, and the two being connected by slots and set-screws, pins and holes, or any other known extension device. It can also be adjusted vertically by bending up the inner end of the plate, which is attached to the beam A², and confining it to said beam by a slot and set-screw, $s\ s'$, or otherwise. A chain, S¹, connects the outer end of the marker-arm to the beam A² in front of it, and serves to support the marker and prevent its being broken off by running against obstacles.

Sixth, the outside frame-pieces, with their connected scoop-plows R R, can be entirely removed, if desired. The front end of all the beams A² A¹ A, where they hinge to the link V, may be made vertically adjustable by means of a slot and pin.

Figure 8:
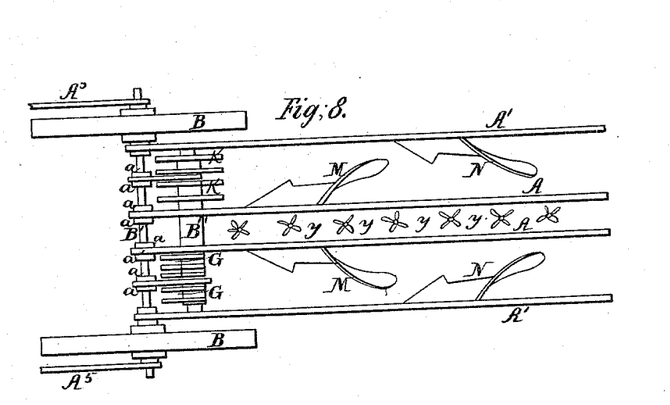
Fig. 8 is a detached view, showing the combination for barring off young crops, and also showing the plows in combination with the digging-wheel and harrow, one-half of each being represented.

Seventh, the harrow and cutting and digging-wheels. The digging-wheels K are a set of curved sharp-edged and sharp-pointed arms, or, rather, a set of wheels having curved, sharp, and pointed arms or spikes attached to a shaft, B'', which extends across the machine, directly behind and below the axle-tree B'. The wheels K K may revolve loosely on the shaft B'', or may be affixed thereto, and the latter be made to rotate by means of belt and pulleys or gearing. A harrow, the form and construction of which are shown in Fig. 7, may operate on the shaft B'', instead of the digging-wheels. The harrow is made with three arms of different lengths, one striking the ground first and tearing it up slightly, the second following in its track, and striking a little deeper, tearing it up a little more, and the third bringing up the rear and completing the work effectually. Collars, or washers, or sections of pipe, may be placed upon the shaft B², between the harrows or the cutters, to keep them the proper distance apart. A circular disk-cutter, $k^3$, having sharp edges, might be employed directly in front of the plows P P, or any other of the plows, to cut the dirt and trash, prevent their clogging, and make it easier work for them to open their furrow. The harrows G G may be arranged in any required number and position upon the shaft B'', as may also the digging-wheels K K and the cutters $k^3$. An arrangement of both is shown in Fig. 8, harrows being attached on one end of the shaft and digging-wheels on the other. This harrow-tooth may be used for loosening roads or any earth, for shoveling, for any purpose whatever, or it may be applied to the screw No. 3, at the rear end of the beams, for the purpose of harrowing after the plows, or by reversing the digging-wheel, end for end, and putting a perch of wood or any other suitable material through the sheath, behind the stays 11, it prevents the wheel from revolving, and acts similar to the harrow-tooth, taking different depths.

Figure 4:
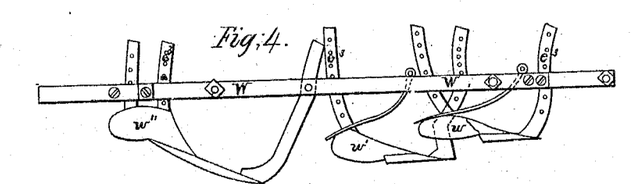
Fig. 4, a side elevation of the combination for deep plowing.

Eighth, instead of the beams A A¹ A² and their plows and other connected apparatus, as represented in Figs. 1 and 2, an attachable and detachable device (represented in Figs. 4 and 5) may be employed. In this device three plows, $w\ w^1\ w^2$, are attached to two beams, W W', lying parallel to each other, and attached in place of the beams A A¹ A². The first plow, $w$, is elevated several inches higher than the rear ones, and it cuts away the sod or soil, say, to a depth of four inches, or any other depth to which it may be adjusted. Then follows the middle plow, $w^1$, which cuts four inches deeper in the same track, and throws its dirt in such a manner upon the furrow-slice made by the first plow. Last of all comes the rear plow, $w^2$, which cuts in the same track four inches deeper still, making the whole furrow twelve inches deep, and casting its earth upon the ridge made by the two front plows, so that all three combine to make but one furrow, and throw up but one ridge or furrow-slice. The rear plow, having a novel and peculiar work to perform in elevating its dirt so far, is made in a novel and peculiar manner, having two standards on each side—four in all—to support it, and having a long gently-inclined share, up which incline the earth is pushed for some distance, in a line directly backward, till it comes to the mold-board $w^3$ at the upper and rear end of the plow, which turns the dirt off on the right side upon the top of the ridge left by the forward plows. All these plows are adjustable in height and pitch, as above described. In all of them the forward standards serve both as colters and as supports for the plow point and share. The beams W W are themselves hinged to the links or arms V V. The marker can be connected with the beams W W, if desired, as above described. The rear standards of the plows are forked at their lower extremities, one fork running down behind and near the front edge of the mold-board and share toward the point of the plow, the other running down behind the mold-board and share in a line nearer to their rear or outer edge, and the two forks supporting both the mold-board and share. The mold-board and share are each bolted independently of the other to the forks of the standard, so that the mold-board can be removed. I frequently remove the mold-board and cultivate with the share and standards, which simply raises the soil up and loosens it thoroughly without turning it over. All the plows may be constructed in this manner, as seen in Figs. 4 and 5.

Ninth, the canopy can be adjusted by means of the slots and set-screws $d\ d'$, in a manner that will be understood by a glance at the drawings. The front edge of the canopy, or either of its sides, can be thus depressed or raised, and caused to assume any desired inclination which will promote the comfort and convenience of the driver, or may be so elevated as to act as a sail to assist the horses. In case of a storm it can be lowered so as to protect the driver from the rain. The canopy-cover is made by being hemmed, and an expansive cord run through the hem, so that it is held to the frame without any other fastening, and can readily be removed by simply raising one end up and pulling it off.

Tenth, in order that the screw-threads upon the axle $B'$ may be protected from injury by the hubs of the draft-wheels, I inclose them in or surround their ends or bearing portion with a piece of tube of suitable dimensions and character. I then employ two screw-nuts on the axle—one at each end of the tube. By screwing the nuts firmly against the ends of the tube, the latter is held fixed in place, and cannot rotate independently of the axle. The wheels run on the tubes between the nuts, not coming in contact with the axle at all. Of course, the tubes can be set out or in on the axle, and the position of the wheels can be thus adjusted at pleasure, besides perfectly protecting the screw-threads from injury.

Eleventh, the different forms of the colter, or sharp-edged forward standard of the plows, is worthy of particular notice, being adapted to the different varieties of soil in which the machine may have to operate. The edge will be sharper and incline more as the soil is tougher, or more encumbered with sticks, roots, grass, &c., and more inclined to throw the plows out or retard their action. Springs $x\ x$ may be employed to keep the plows down properly, while yet allowing them to rise to pass over obstacles.

Twelfth, the cross-bar $H^2$, Fig. 3, attached to the draft-pole, passes under the rear horses, which are attached thereto by straps or chains passing over their backs, upon which is borne any weight which may be thrown upon the pole by the inequalities of the ground, and also prevents it from being thrown up, or the machine from being capsized.

The different combinations of the parts hereinabove described, and the particular adaptation and use of each combination, may, perhaps, be best described by a reference to each of the several drawings above referred to in their order.

Figs. 1 and 2.—The parts used in planting are all represented here, consisting of the digger-wheels, opening-plows, seeding apparatus, covering-plows, device Q for leveling off the ground upon the planted seed, and pressing it down to the degree that may be required, and the marker. The steering apparatus, trace and whiffletree attachment, and canopy will, of course, be employed with this combination. The scoops, plows P P, scraper Q, will not be used. The harrow and cutter-wheels $k^3$ may or may not be used, according to circumstances.

Figs. 4 and 5 represent the combination which is occasionally employed for very deep plowing and breaking up, and which may be attached alone to the machine, the other plows, harrows, &c., being removed, or the digging-wheel, harrow, or cutting-wheels may be used with it.

Figure 6:
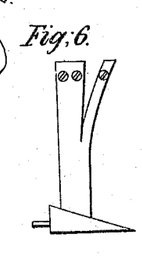
Fig. 6, a detached view of the mole-plow.
Figures 15, 16:
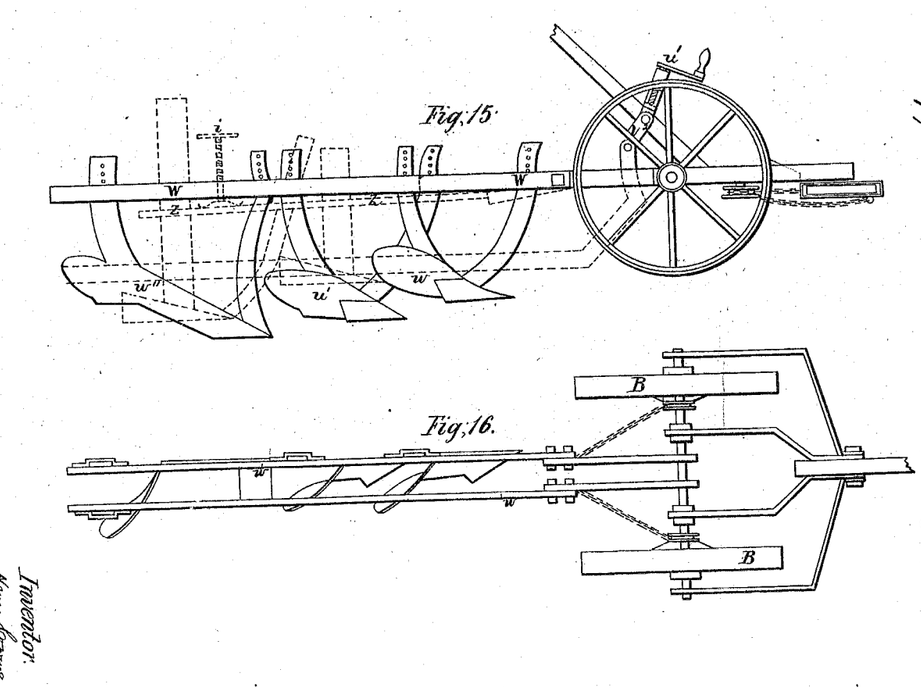
Fig. 15 is a side elevation of the combination for deep plowing, the red lines showing the same with the mole-plow attached.
Fig. 16 is a top view of the same.

The mole-plows shown in Fig. 6 may be used instead of the three plows $w\ w^1\ w^2$, and may be arranged as shown in red lines in Fig. 15, so that each one shall run deeper than the one preceding it. A bar, Z, spring $z$, and hand-screw $z'$ may be used to regulate the depth of the mole-plows, and give them sufficient play.

The moles of the forward plows may be taken off of the standards, and the latter used alone, as plows or cutters, to cut through the soil at different depths, and prepare the way for the rear plow, each one cutting deeper than the one before it, as above described, so that the force is thrown in different parts of the beam.

Fig. 8 shows a combination for cultivating young corn, cane, cotton, tobacco, or any other crop that grows in rows. The crop is shown at y y. The plows M M of Fig. 1 are separated, so as to pass on each side of the row of young plants and throw the dirt off of their roots. The plows N N follow immediately behind, and a little outside of the plows U U, and, intercepting the dirt thrown out by the forward plows, throw it back, finely pulverized, to the plants. The digging-wheels K or the harrows G may be used in connection with this combination, or even independently of it, to pulverize the earth between the rows, and may, in some cases, prove effectual for the purpose without the plows.

Figure 9:
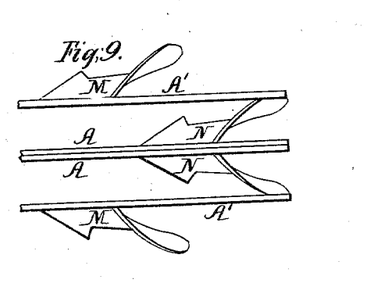
Fig. 9 is a ground plan of the plows as arranged for cultivating the whole space between the rows of corn or cane when high.

Fig. 9 shows a combination which I employ for plowing between the rows when the corn, cane, or other plant is from four to six feet high. The two beams A A are brought together. The plows M M are attached to the beams A' A', and the plows N N to the beams A A, in such a position that all the plows shall throw the dirt outward, the plows N N forming together a double mold-board plow. In this way, the instrument will thoroughly loosen up the earth, and cultivate the whole space between two rows at once.

I can set the center plows N N to run deep and the side plows M M to run shallow, so as to ridge up the earth as effectually as if a single plow were used, and without injuring the roots of the crop. To do this, a shorter axle-tree is used, and the wheels run inside of the outside beams, so as not to injure the roots or the plants.

Figs. 10 and 11 represent a combination which is employed for breaking up and preparing the ground for planting. The tines $T^4 T^4$, arranged to cut at different depths, thoroughly tear up and pulverize the earth in the center of the space, and in advance of the plows. The plows N N then throw the earth together under the center of the instrument, and the plows M M, now attached to the outer beams $A^2 A^2$, throw up other furrows, the four plows thus forming a nice bed or ridge to plant upon. By taking out the tines $T^4 T^4$, the rest of this combination may be employed for cultivating between the rows till the corn or other crop is three feet or less in height. The digging-wheels may be applied in front of the plow when used for this purpose, thus enabling the plows to throw any amount of soil to the plant, doing away with hoeing, and by throwing it to each side of the plant at once, do not injure the plant, by pressing it down, as is the case by cultivating one side at a time. The axle of the harrow may be raised in the center as high as the axle, or two short axles may be used for the digging-wheels, and two arms running down from the center beams, in which the inner of the short axle-trees are pivoted into, so that the crop may be cultivated with the digging-wheels till the crop is as high as the axle of the machine.

Figure 12:
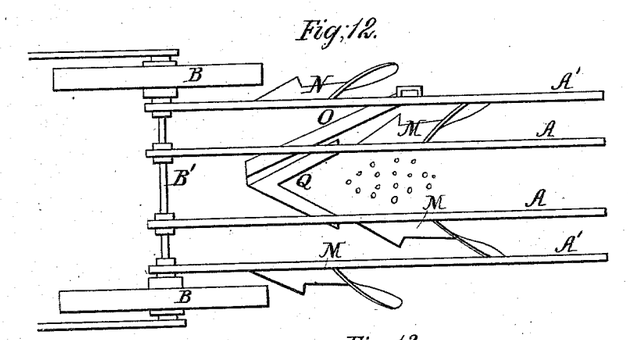
Fig. 12 is a top view, showing the ratoon or stubble cutter, and the combinations for barring off both sides of the stubble at the same time.
Figures 13, 14:
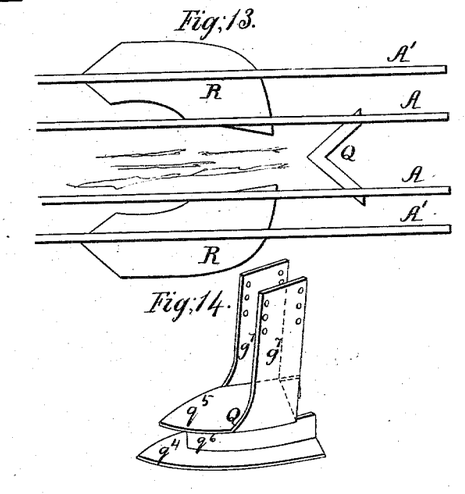
Fig. 13 is a top view of the scoops for covering the cane, and the scraper for removing any desired amount of soil from the top of the cane after being so covered.
Fig. 14 is a detached perspective view of the leveling-scraper or stubble loosener or lowerer.

Fig. 12 represents a combination which is employed in the spring for the special purpose of laying the cane open and exposing the stubble to the sun, or "baring off" the stubble or planted cane, as the operation is technically named, and for removing the unnecessary earth, cut stubble, &c., out of the way, and cutting a furrow on each side of the row, so as to let the heat and light of the sun in to the roots or the planted cane. In this combination, the scraper Q, the form of which is fully shown in Fig. 14, is employed to cut the stubble and scrape off the earth from above the planted cane or the stubble. The parts $q^4$ and $q^6$ may be detached and removed from the instrument Q, leaving the parts $q^5$ and $q^7 q^7$, which are made of one piece. $q^5$ is a sharp-edged plate, which, when thus detached from the parts below, can be run under the planted cane or stubble, loosening the earth beneath by lowering the point more than the rear part, forming a slight incline and around it, and stirring up the planted cane or stubble, so as to let the air and warmth in from above.

When the instrument Q is in the form shown in Fig. 14, the parts $q^5$ and $q^4$ form two sharp-edged knives, about six inches apart, and connected by the triangular or wedge-shaped part $q^6$. Thus constructed, the instrument may be used to perform a new and very important function. It can be forced along under the stubble, and the two knives $q^4 q^5$ cut out about six inches of the soil or earth under the stubble, which portion thus cut out is removed by the wedge-shaped part $q^6$. This lowers the stubble six inches, and obviates the necessity of replanting the cane.

The same operation of lowering the cane, or the equivalent thereof, can be performed by the combination represented in Fig. 16. In that case, I use the plows there shown to open a deep furrow alongside of the row of planted cane or stubble, and I then go over the ground and plow the said cane or stubble, or turn it with a plow over into the furrow thus formed. The instrument may be constructed with an additional beam and a turning-plow, if desired, for convenience in performing this operation. Instead of the instrument Q, when employed for scraping off the surface of the soil above the planted cane or stubble, the flat steel spring-scraper O may be used, and may be supported by standards attached to the beams, or by being bolted to two of the plows, as represented in Fig. 2. When the steel blade O is thus used, the instrument Q would be placed behind the plows, in a line with the scraper, to remove the stubble, &c., cut off by the scraper. The scraper may have either a sickle-edge or a straight sharp edge. When the stubble is lowered it need not be cut, or when it is turned into the furrow it need not, only when these operations are not performed. If the steel spring for cutting the stubble be preferable, one end may be fastened behind the hind plow, $M^1$, and extending forward across the stubble to the forward plow, M, which may be placed as far in advance as possible, so as to make as acute an angle as possible. Should there be any tendency to press the machine out of line, a similar one may be run across from the other side. The plows N N M M are arranged as shown in the drawings, Fig. 12. The plows M M open a deep furrow along on either side of the planted cane or stubble, and let the light and warmth thoroughly in to the plants. The outer plows, N N, open another furrow, so that two furrows are thrown back into the center of the space beneath the rows. Fig. 13 shows another combination, consisting of the scoops R R and instrument Q, for the purpose of covering the cane. I first bring the plows M M together, so as to form a double mold-board plow, as hereinbefore described. I then bring the plows N N together in the same way. The two double mold-board plows thus formed are arranged one behind the other, and open a deep furrow to receive the cane. The cane is then planted by hand in the furrow, after which the instrument (combination, Fig. 13) is put into the ground, bestriding the furrow, as shown in Fig. 13, and is driven ahead or to the left, as there represented. The scoops R R take up the earth at some distance from the cane, and, raising it and conveying it inward toward the furrow, drop it upon the cane, thoroughly covering the latter. The scraper Q follows, leveling off the dirt to the depth required, and pressing it down. By this means I avoid the difficulty which has heretofore attended the use of plows for covering cane—namely, their pressing the earth against it so as to displace it, instead of raising the dirt and dropping it gently upon the planted cane, so that the cane is not displaced, but covered as laid. Figs. 15 and 16 represent in full a combination which has been sufficiently described already in connection with Figs. 4 and 5. The method of constructing and operating the device for elevating the front end of the frame or plow-beams A A$^1$ A$^2$ is, however, shown more fully in these drawings, than in any of the others. When the tripping-bar $p$ is attached to the end of the cross-bar A$^3$, as shown in Fig. 2, I would employ chain-connections V V, instead of a single hinged arm, which would be preferable to the chain, when the tripping-bar is not used, as by them the fore wheels can be raised off the ground, thereby throwing the whole weight of the machine on the plows, which might be most desirable in very stiff lands, to compel the plows to go into the ground, jointed at either end to increase the flexibility of the connection, and enable the plows to be instantly raised by the power of the horses, which could not be done very well with the hinged arm. The ratchet may or may not then be employed for holding the plow-beams up and lowering them gradually or instantaneously to the ground, as it could be done easily by the screw $u$. The dotted red lines in Fig. 16 show the position of the plow-beams and the adjusting-bar when the mole-plows are in operation. The hind plow, with an inclined plane, will make a small surface-ditcher by having a right and left mold-board. Putting them both together, quite a good-sized ditch could be made, or by running the single plow up one side and down the other would accomplish the same effect nearly by having a thin piece running up between the front and rear standards on the land-side, to prevent the soil from falling into the ditch; or the scoop can be used in a similar manner, and the front standard may be widened at the top, as seen by the adjustable cross-piece on the top, as shown in the drawings, Figs. 1 and 2. By this simple arrangement, all the difficulties of cultivating the South by white labor are entirely overcome, and supplies the great want of labor in the West, and adds prosperity to the whole country.

Having thus described my invention, what I claim as new, and desire to secure by Letters Patent, is—

1. The application and combination of the double-block system of equalizing draft, as above set forth.

2. The application and combination of the single-block system, in combination with the double-block system.

3. The quadruple whiffletree.

4. The application and combination of the cross-bar H$^2$ with the tongue, for the purposes specified.

5. The slotted slide-bar Q for the whiffletrees to slide upon, as set forth.

6. The joint in the tongue, as and for the purposes set forth.

7. The rotary grooved cylinder, as and for the purposes specified.

8. The adjustable thumb-screw $l'$, in combination with a slide-valve, for regulating the quantity of grain sown.

9. The application of a steering apparatus to agricultural machines, composed of the wheels I, cross-bar K, sheaves $i$ $i'$, standards I$'$, rope or chain J, stirrups $j$ $j$, cross-bar $l$, and the levers L and L$'$.

10. The standards I$'$ and the adjustable cross-beam K.

11. The standards D$^1$ D$^2$ of the canopy, the cross-bars provided with screws $d$ $d$, for the purposes set forth.

12. The curved standards $e^3$ and box-straps $e^4$, for the purposes specified.

13. The semicircular rack-lever E and handle and stop-lever spring $f$, for the purposes herein set forth.

14. The tripping-lever $p$ and cord or chain $p'$, for the purpose herein set forth.

15. The application of horse or other power that may be employed to draw the machine, for raising the plows and instruments out of and from the ground, as set forth.

16. The application and combination of a scraper and presser to a gang of plows, for the purposes herein set forth.

17. The cross-bars A$^3$ A$^4$, for the purpose herein specified.

18. The construction of an axle so that the wheels can be moved farther apart or nearer together, to suit the widths of rows, as above specified.

19. In combination with a gang of plows, the digging-wheel K.

20. The digging-wheel, in combination with the arrangement for raising or lowering it, as set forth.

21. The three-toothed harrow G, or its equivalent, as and for the purpose set forth.

22. Making the shares and colter in one piece, as and for the purposes above specified.

23. The application and combination of a canopy to a gang of plows or harvesting-machines, for the purposes above specified.

24. The manner of making canopies with an expansive cord, as and for the purpose above specified.

25. The tube on which the main wheels revolve, for the purposes herein specified.

26. The curved plow-standards and the springs, for the purpose above specified.

27. The constructing of a plow so that in raking a root or stone it will be thrown out and forced immediately back, as above specified.

28. The nest of cups in the cylinder, for the purpose herein set forth.

29. The combination, as seen in Figs. 1 and 2, for the purpose of planting or sowing, as above specified.

30. The application and combination of the cross-bar H' with the tongue H, Fig. 3, for the purposes herein set forth.

31. The combination, as seen in Figs. 4 and 5, and the particular shape of the third plow, with the incline for raising up the soil before turning over, as above set forth.

32. The mole-plow, in combination with the beams seen in Fig. 15, wheel-raising apparatus, quadruple-trees and their arrangement, for the purposes herein specified.

33. The opening of the mold at different depths, and taking off the front molds and using their standards only, and using them all at once or separately, as above set forth.

34. The application and combination, as seen in Fig. 8, with its modifications, for the purposes herein set forth.

35. The application and combination, as seen in Figs. 10 and 11, of the gangs of plows, and the tines in the center, or before or behind the plows, as above set forth.

36. The stubble-lowerer Q, and the arrangement herein set forth for opening a deep furrow and turning the stubble into it, and the arrangement and combination of the plows, as seen in Fig. 12, or their equivalent as set forth.

37. The arrangement and combination, as seen in Fig. 13, for covering the canes, as set forth.

38. The single-hinged arm, for the purpose herein set forth.

39. The arrangement for ditching, as set forth, and under-draining by the mold-plow, as set forth.

HENRY COWING.

Witnesses:
 SOLON C. KEMON,
 A. M. TANNER.